Nov. 14, 1933.   R. J. KEOGH   1,935,569
ELECTRIC CURRENT CONVERTER FOR RADIO OR OTHER APPARATUS
Filed Jan. 27, 1930
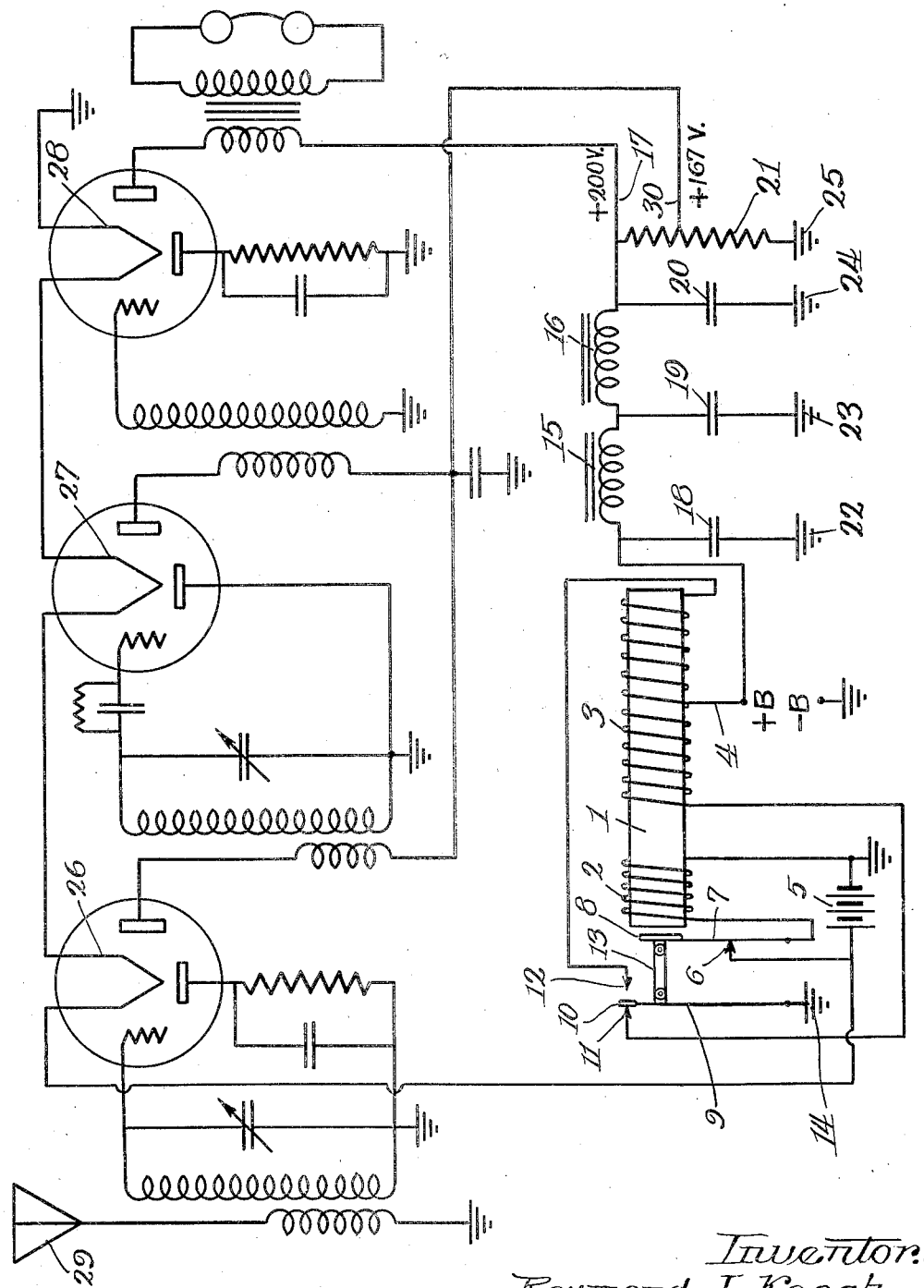
Inventor:
Raymond J. Keogh
By Arthur F. Durand
Atty.

Patented Nov. 14, 1933

1,935,569

UNITED STATES PATENT OFFICE 1,935,569

ELECTRIC CURRENT CONVERTER FOR RADIO OR OTHER APPARATUS

Raymond J. Keogh, Chicago, Ill., assignor, by mesne assignments, to Utah Radio Products Company, Chicago, Ill., a corporation of Illinois Application January 27, 1930. Serial No. 423,590

1 Claim. (Cl. 171—97)

This invention relates to apparatus for converting alternating current into direct current, and more particularly to apparatus for converting direct current, such as storage battery current, into alternating current, and then into direct current suitable for use in various ways, such as for the purpose of operating a radio receiving set.

Generally stated, therefore, the object of the invention is to provide a novel and improved arrangement involving, preferably, a transformer and interrupter for converting a direct current of relatively low potential, such as a storage battery current, into an alternating current, in combination with means for converting the alternating current into a direct current, of relatively high potential, suitable for use in a radio receiving set, for the plate potential, or for other purposes, said transformer having a vibratory armature provided with circuit-controlling contacts for controlling both the input and output circuits of said transformer, whereby the input becomes in effect an alternating current in said transformer, whereas the output from said transformer is a direct current, whereby the relatively low potential current that is suitable for the filament circuit of the radio set is stepped up to a higher voltage for the plate circuit of the receiving set, the transformer having a divided secondary, the two sections of which are alternately included by contacts of said armature in said plate circuit.

It is also an object to provide a construction and arrangement whereby the secondary of said transformer is divided, by an intermediate tap thereto, while the primary is not thus divided, whereby the entire primary is effective at all times in the operation of a transformer.

It is also an object to provide certain details and features of construction and combinations tending to increase the general efficiency and the desirability of a current transforming and conversion apparatus of this particular character.

To the foregoing and other useful ends, the invention consists in matters hereinafter set forth and claimed and shown in the accompanying drawing, in which the single figure is a diagram showing the transforming and converting apparatus embodying the principles of the invention.

As thus illustrated, the invention comprises a transformer having a core 1, a primary 2 and a secondary 3, the secondary having an intermediate tap 4 thereto, whereby the secondary is divided into two parts or sections.

The battery 5 may be the storage battery of an automobile, or of an aeroplane, or motor boat, or it may be any other source of direct current. This battery is included in circuit with the primary 2 by means of the stationary contact 6 and the movable contact 7, which latter may be a spring with a buzzer armature 8 thereon, disposed in juxtaposition to the end of the core 1, previously mentioned. Normally, this primary winding circuit is closed, as shown.

The buzzer mechanism also involves a spring 9 having a movable contact 10 normally engaging a stationary contact 11, which latter is connected to one terminal of the secondary 3, as shown, and the other terminal of said secondary is connected, as shown, to the stationary contact 12 of said buzzer mechanism, the contact 12 being normally out of contact with the movable contact 10, as shown in the drawing. The springs 7 and 9 are preferably connected together, by any suitable means, such as the link 13, whereby the armature 8 and the contact 10 will vibrate in unison. The spring 9 is grounded at 14, as shown.

The middle tap 4 is preferably connected through impedance or choke coils 15 and 16 with the terminal point 17, and also through parallel condensers 18, 19, 20, and the resistance coil 21, with the grounded points 22, 23, 24 and 25, as shown.

With this arrangement, the input of direct current from the battery 5 becomes in effect an alternating current in the transformer, but by reason of the contacts 10, 11 and 12, and the middle tap 4 to the secondary 3, the output from the transformer is in effect a direct pulsating current, but this pulsating current becomes a continuous current, owing to the presence in the output circuit of the inductance 15 and 16 and the character of the output circuit, as shown and described.

The direct current, thus derived as the output from the transformer, can be used for various purposes, may be used, for example, to operate a radio receiving set such as the radio apparatus shown in the upper portion of the drawing. As shown, the filaments 26, 27 and 28 of the three tubes are operated by current directed from the battery 5, the three filaments being in series. On the other hand, the plates of the three tubes, it will be seen, are connected to the output circuit of said transformer, the plates of the first and second tubes after the aerial 29 being connected to the terminal 30, which is in turn connected to an intermediate point on the resistance 21, previously mentioned; while the plate of the third or last tube is connected, as shown, to the terminal 17, previously mentioned, whereby a higher voltage is maintained on the plate circuit of the third tube, than on the plate circuits of the first and second tubes. In this way, the entire radio apparatus is operated from the storage battery 5, or other source of direct current, and the desired potentials are maintained on the plates of the radio tubes. The buzzer mechanism of the transformer serves in effect, it will be understood, to reverse every other impulse of the alternating current in the transformer, whereby the output from the transformer is a pulsating direct current, with the impulses all in the same direction; and this pulsating output current is then flattened or modified into a continuous direct current by the action of the capacity and inductance arranged as shown in the output circuit.

There are different uses for the invention, of course, but in the operation of a radio set on an automobile, from the ordinary storage battery of the car, in the manner shown and described, the modus operandi includes the stepping up of the low potential battery current to a higher potential current suitable for the plate circuit of a radio set, whereby a low potential current source becomes available not only for its ordinary uses, as on the automobile, and for the radio filament circuit, but also for the plate circuit of the radio set.

What I claim as my invention is:

In an apparatus for deriving a direct current of relatively high potential from a source of direct current of relatively low potential, the combination of a source of direct current of relatively low potential, a converter transformer comprising a core having, a primary winding thereon connected to said source, a secondary winding thereon of a relatively greater number of turns than the primary winding, and interrupting means provided with a single vibratory armature having make and break means to so interrupt the current flow to said primary winding as to produce a pulsating current therein and an alternating current in the secondary winding, an output circuit having a connection to an intermediate point in the secondary winding, and said interrupting means including contacts for so alternately connecting the ends of the secondary winding into said circuit as to produce a direct current therein of relatively high potential.

RAYMOND J. KEOGH.